June 27, 1961 L. R. McGUIRE 2,990,157
WELL DRILLING BALL CLUTCHED PIPE HOISTS
Filed March 17, 1959 2 Sheets-Sheet 1

INVENTOR
Lee R. McGuire

June 27, 1961  L. R. McGUIRE  2,990,157
WELL DRILLING BALL CLUTCHED PIPE HOISTS
Filed March 17, 1959  2 Sheets-Sheet 2
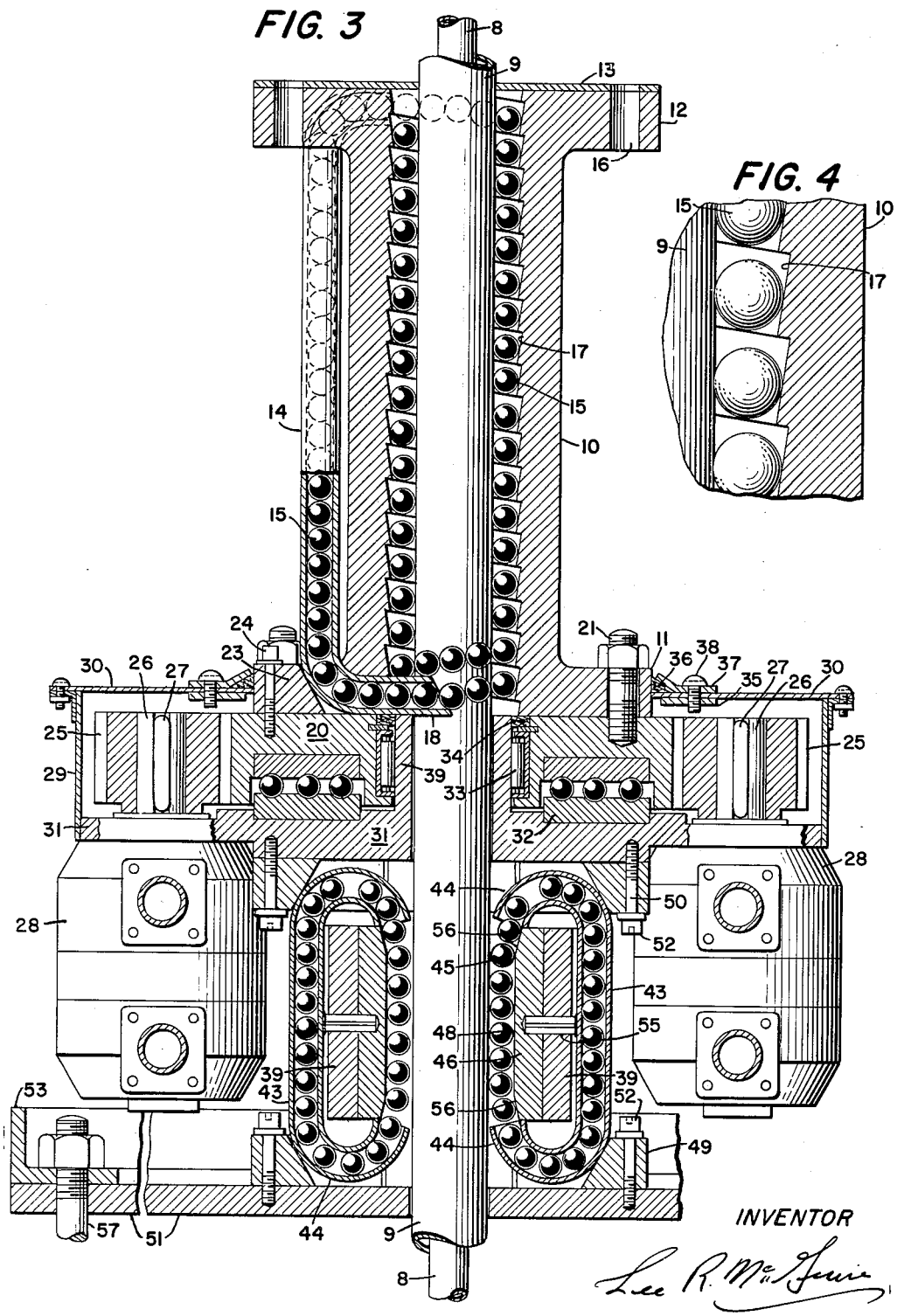
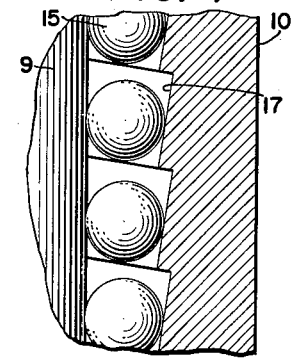
INVENTOR
Lee R. McGuire ated June 27, 1961

2,990,157
WELL DRILLING BALL CLUTCHED
PIPE HOISTS
Lee R. McGuire, 2442 Hammond Place,
Wilmington 8, Del.
Filed Mar. 17, 1959, Ser. No. 799,950
7 Claims. (Cl. 254—29)

This invention relates to a new and useful apparatus to provide a reversible and controlled variable speed linear movement to a lengthy and heavy cylindrical member or pipe.

It includes in combination, a helically movable tightly wedged stream of ball bearings by which the pipe is given linear motion, a plurality of linear movable tightly wedged oppositely paired ball bearing streams which prevent either clockwise or counter-clockwise rotation of the pipe about its longitudinal axis, and a means of converting rotary motion into linear movement.

A preferred embodiment of this invention relates to the suspension of, or the raising and lowering of a heavy lengthy, round tubular pipe in deep earthen well holes as produced during the drilling of oil and gas wells, it being particularly adapted for use with the well-drilling apparatus disclosed in applicant's U.S. Patent No. 2,893,696.

Among the principal objectives of the present invention are those below listed:

(a) To provide a powerful, simple and inexpensive hoisting means, whereby the power utilized to hold, raise and lower long lengths of heavy pipe in earthen well holes may be directly applied to the round pipe exterior surface by a helically moving stream of rotatable wedged ball bearings. Thereby elimininating need for such large conventional major well drilling components as a "draw works" including a massive power transmission, cable winding drums, brakes, torque convertors, lengthy large diameter wire ropes together with extensive auxiliary apparatus. This invention also eliminates the need for high and heavy structural steel masts and the conventional large steel working deck, it further provides for a major reduction in concrete foundation costs, installation or set-up costs, and costs of drilling equipment removal and transport to a new well site on completion of a current assignment.

(b) To provide a wedged ball clutched pipe hoisting apparatus capable of imparting a non-rotating and precisely controlled linear movement to a lengthy and heavy round pipe having a relatively smooth exterior surface. The apparatus here disclosed is predicated on the use of a subterranean motor driven earth cutting tool and avoids the conventional use of a twisted slender long rotating drill pipe suspended from a resilient overhead wire rope, a combination which is subject to a widely fluctuating rate of linear movement to the detriment of both the earth cutting tool and the rate of hole penetration.

Additional objectives, advantages, and uses of the present invention will become apparent from the following description and drawings where-in like numerals represent like parts in the several views.

FIGURE 3 is an enlarged scale cross-sectional elevation, viewed along line 3—3 of FIGURE 1.

FIGURE 4 is a fragmentary enlargement of the helically grooved wedge-like ball bearing race.

Figure 1:
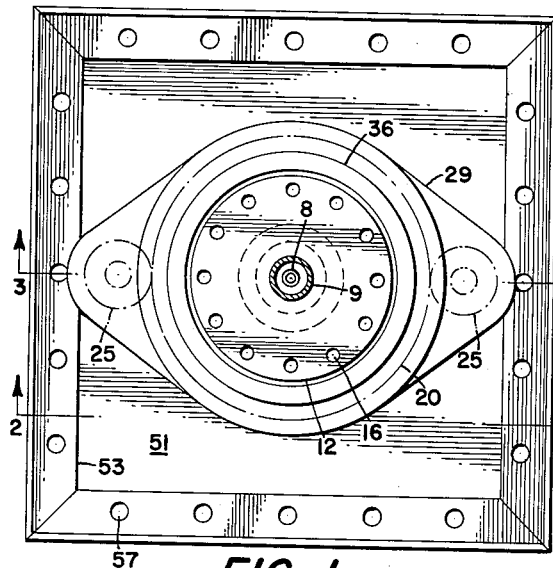
FIGURE 1 is a small scale plan view of the assembled apparatus.

In FIGURE 1, conveyor pipe 8 is positioned within feed pipe 9 which is centrally located and extends downward through the assembled apparatus and into the earthen well hole below the entire assembly. As will be subsequently shown, a main function of the apparatus is the controlled raising and lowering of feed pipe 9 which may be several miles in length and weigh many tons, and in so functioning the load always acts in one direction, namely, downward.

Top flange 12 and bolt holes 16 are for supporting auxiliary equipment which is not part of this invention. Base plate 51 with edge angle 53 is provided with a plurality of bolt holes 57 for rigidly positioning the assembled apparatus on a suitable foundation.

Figure 2:
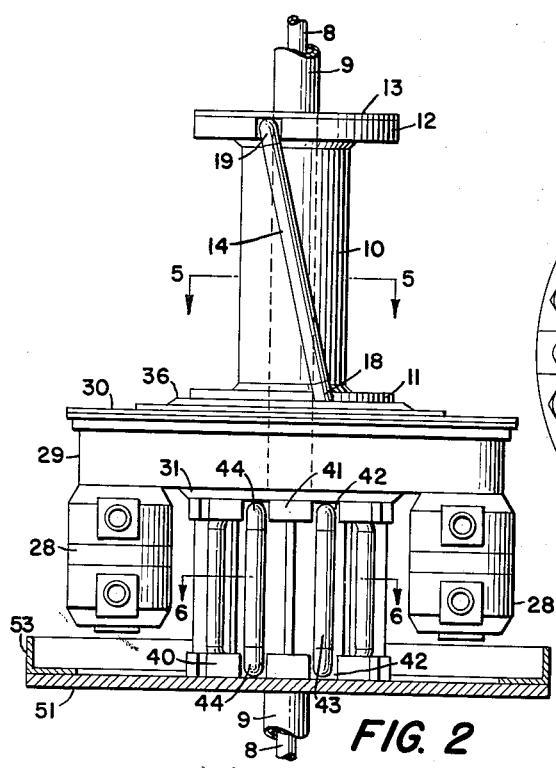
FIGURE 2 is a small scale side elevation, viewed along line 2—2 of FIGURE 1.

FIGURE 2 further discloses the above mentioned parts and ball bearing return tube 14 which includes the angular extensions 18 and 19 at its opposite ends. These extensions project to the interior of body 10 through slots cut in circular flanges 11 and 12. Return tube 14 is positioned diagonally between slotted flanges 11 and 12 to provide a closed circuitous path for ball stream movement as is more clearly indicated by FIGURES 3 and 5.

FIGURE 3 is an enlarged cross-sectional elevation view taken along line 3—3 of FIGURE 1. It clearly indicates the three coacting mechanisms which form this invention, namely, the tubular top section or helically wedged ball clutch assembly, the central or power transmission assembly, and the bottom or pipe antirotation ball clutch assembly, all acting in combination to provide a linear movement to pipe 9 which passes co-axially through the entire assembly.

Small conveyor pipe 8 is positioned within feed pipe 9 with its weight carried thereby. Pipe 8 includes an earth cutting tool and a subterranean motor at its lower end. These pipes 8 and 9 may extend downward into the earth several miles and weigh many tons. Part 10 is the hardened steel tubular body of the helically wedged ball clutch assembly. This assembly also includes lower flange 11, top flange 12, flange cover plate 13, and external tube 14 to complete the closed circuitous path for returning the moving stream of ball bearings 15 into reclutching position at the top or bottom of the helical ball race depending upon whether body 10 is being rotated to lower or raise feed pipe 9.

Top flange 12 and cover plate 13 includes a plurality of bolt holes 16 for the rigid attachment of an additional body member 10 along with a full complement of associated parts when extremely heavy loads or drilling depths are contemplated, otherwise these bolt holes 16 are utilized for the attachment of auxiliary facilities not encompassed by this invention.

The inner wall of tubular body 10 includes a continuous helical groove of sharply acute angle wedge form extending spirally throughout the length of body 10. The helically inclined face 17 (FIG. 4) of this wedge shaped groove constitutes the outer ball race, and the relatively smooth external cylindrical surface of feed pipe 9 constitutes the inner ball race. The ease with which heavily loaded tightly wedged large diameter ball bearings may be caused to roll is generally known throughout the mechanical arts, as is also the increased magnitude of forces acting in a plane perpendicular to the inclined face of a wedge subjected to a wedging force.

In the present invention each successive ball above another in the continuous helical ball stream 15 transmits part of its weight to the stream of balls below it, and thus the wedged frictional contact of all balls lower in the helical path is progressively increased in frictional contact and wedging force acting against the inclined surface 17 and the external surface of feed pipe 9 due solely to the helical ball stream weight without consideration of the added wedged ball forces derived from the downwardly acting weight of feed pipe 9.

If we now consider the total downwardly acting weight of feed pipe 9 and its effect upon the already tightly wedged ball stream 15, it is seen that any tendency of the heavy pipe 9 to move downward will only result in greatly increasing the magnitude of the wedging force applied to each ball in the helical path between the inclined surface 17 and the external surface of feed pipe 9. This added weight greatly intensifies the frictional contact or clutching grip of the ball stream 15 around pipe 9 and resists a downward movement of the pipe weight under conditions of sliding friction. It should be noted that an excessively high wedged ball force will result in the permanent indentation (Brinell effect) of the otherwise relatively smooth surface of pipe 9 due to the small contact area and high unit stresses associated with the transfer of large forces concentrated in a small area as prevails with ball clutching contacts.

By judiciously proportioning the angle of the inclined wedge surface 17, the number and diameter of the helically movable balls in relation to the elastic properties of tubular feed pipe 9, and the maximum weight of said pipe, a wedged ball frictional contact of suitable magnitude may be attained to prevent the linear movement of feed pipe 9 under conditions of sliding friction while simultaneously providing for said linear movement under conditions of rolling ball friction as prevails when the body 10 and its outer ball race 17 is rotated in either direction by a controlled source of power while the inner ball race or surface of feed pipe 9 is held against rotating about its longitudinal axis. It will assist in understanding the above statement by realizing that the coefficient of sliding friction under conditions of very high load or weight per unit of contact area may be several hundred times the coefficient of rolling friction under the same load conditions. The invention thus provides for maintaining a seized or fully clutched state of sliding friction, while simultaneously maintaining a free state of ball rolling frictional contact between the helically positioned balls and the external surface of feed pipe 9.

Figure 5:
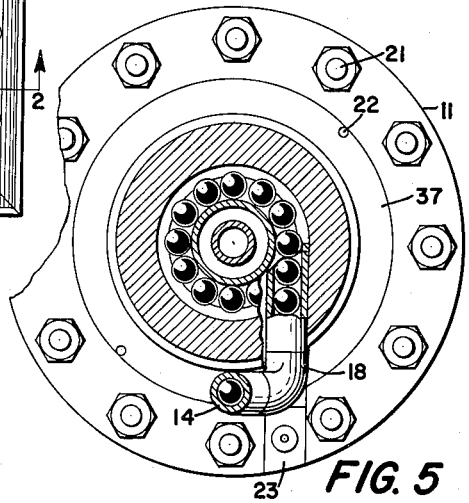
FIGURE 5 is an enlarged sectional plan view taken along line 5—5 of FIGURE 2.

The external ball return tube 14 includes angular tubular extension 18 at its lower end which is more clearly shown by reference to FIG. 5 and a like tubular extension 19 at its upper end. Tubular extensions 18 and 19 project within the interior of body 10, and are positioned tangently to the helical ball stream path 15 in a manner whereby this moving ball stream will clutch and declutch the surface of feed pipe 9 as the balls enter or leave the helical path. The upper and lower positions at which the helical ball stream assumes a straight line movement and the balls lose contact with inclined wedge surface 17 and feed pipe 9 are defined as being the "clutching" and "declutching" positions. The clutching position occurs at the point of ball movement where the ball reenters the helical ball race and enters into wedged contact with the outer surface of feed pipe 9 and the inclined wedge surface 17. The declutching position occurs at the opposite end of body 10 at a point where the helical ball stream 15 leaves the helical path and loses wedged contact with the feed pipe 9 and inclined wedge surface 17. Since the continuous helical or spiral ball stream may be operatively caused to flow either upward or downward by changing the rotative direction of body 10 as in lowering or raising feed pipe 9, the "clutching" and "declutching" positions may alternate depending upon whether the helical ball stream 15 is moving upward or downward.

While supporting the weight of heavy pipe 9, wedged balls 15 tend to move downward along the continuous helically inclined ball path by causing the rotation of body 10 and all parts geared thereto including motor 28 under which condition the motor 28 may be utilized as a hydraulic brake to accurately control the downward rate of pipe movement. Alternately, a substantial amount of motor power must be utilized when raising heavy pipe 9, during which wedged balls 15 are rolled upward on the continuous helically inclined ball race while maintaining a seized clutching contact on the surface of pipe 9 to cause its upward movement as balls 15 move upward.

Lower flange 11 of linear clutch body 10 is rigidly secured to the upper face of drive gear 20 by a plurality of bolts 21 and locating dowel pins 22 (FIG. 5). Key blocks 23 are utilized to hold ball return tube 14 with its angular extensions 18 and 19 (not shown) rigidly in position to receive or discharge the balls into or out of the helical ball stream 15. The key blocks 23 are secured to drive gear 20 by cap screw 24. Drive gear 20 meshes with pinions 25 which are keyed directly to motor shafts 26 by keys 27. Drive motors 28 are preferably of a conventional hydraulic vane type, capable of variable speed control, reversibility, and usable as hydraulic brakes.

Gear case 29 with its top cover 30 is of conventional design and is welded to support plate 31 to form an oil tight enclosure for the lubricating oil provided for gear 20, pinions 25, ball thrust bearing 32 and radial roller bearing 33 which is sealed at its upper end by a compressed felt ring 34. Top cover plate 30 has a reinforcing ring 35 welded on the underside at its inner annular opening. A resilient oil wiper ring 36 is held against the outer periphery of flange 11 by means of retainer ring 37 which is secured to cover 30 and reinforcing ring 35 by use of a plurality of screws 38.

Power transmission support plate 31 includes an upwardly extending annular ring 39 which serves as the inner race for roller bearing 33. This support plate 31 is recessed for mounting the lower portion of ball thrust bearing 32 whose upper portion is tightly fitted into a recess on the under side of drive gear 20. Support plate 31 rests upon tubular body 39 of the anti-rotational ball clutch assembly which will now be described.

As previously stated, the continuous spirally arranged wedged ball stream 15 will firmly clutch the outer surface of feed pipe 9 under "sliding friction" conditions at all times when the balls are fully in wedged position. It is thus evident that a rotation of clutch body 10 would also rotate feed pipe 9 about its longitudinal axis if it is not prevented from so doing. To prevent such objectionable rotation, an anti-rotation linear wedge ball clutch is provided as a co-acting part of this invention. With further reference to FIGURE 3, tubular clutch body 39 has a circular flange 40 (FIG. 6) at its lower end with a like flange 41 at its upper end. These flanges 40 and 41 divided into a plurality of segments by slots 42. The ball return tubes 43 includes 180 degree return tubular bends 44 at the opposite ends thereof to provide for the closed circuit movement of ball streams 45.

Figure 7:
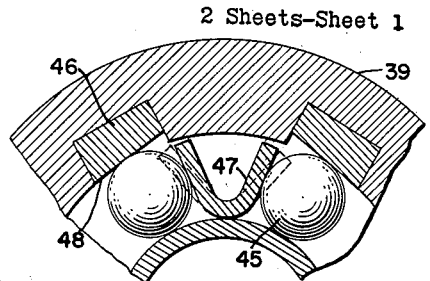
FIGURE 7 is a fragmentary enlargement of FIGURE 6.
Figure 6:
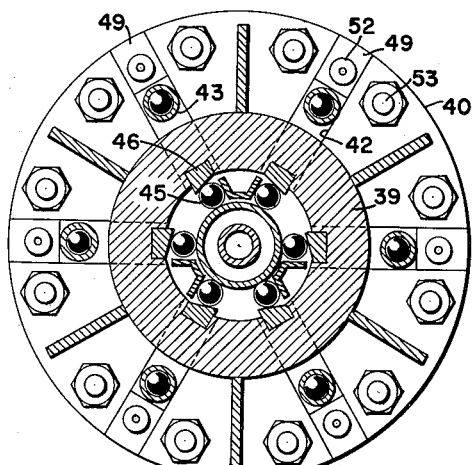
FIGURE 6 is an enlarged sectional plan view taken along line 6—6 of FIGURE 2.

The interior of tubular clutch body 39 includes a plurality of sharply acute angle wedge bars 46 as will be more clearly seen by reference to FIGURES 6 and 7. It will be observed that these wedge bars 46 are recessed almost wholly within the inner periphery of body 39, and on the same radial centers as the ball return tubes 43 including return bends 44. It will also be observed that adjacent wedge bars 46 are located with their inclined wedge surfaces 48 paired in opposite directions for the purpose of limiting the axial rotation of pipe 9 in either clockwise or counterclockwise direction.

Positioned between each pair of oppositely inclined wedge bars 46 is a spring-like resilient ball spreader 47 of suitable material and having a U shape with ends tending to move wider apart. This spreader 47 extends the entire length of the wedge bars 46 and serves to force the adjacent streams of balls 45 into intimate contact with the outer surface of feed pipe 9 and into wedging position on the inclined faces 48 of wedge blocks 46 to insure the uniform clutching of balls on feed pipe 9 and to prevent the axial rotation of said pipe in either direction. While firmly clutched to prevent angular rotation by wedged frictional contact, these rigidly wedged balls 45 are simultaneously free to roll in a linear direction under the "rolling friction" conditions which prevail when feed pipe 9 is raised or lowered, as the balls 45 are not wedged against movement in other than an axial direction.

The anti-rotation ball clutch includes ball return tubes 43 which are rigidly secured against linear movement by split dowel pins 55 that are welded to tubes 43 and extend through clutch body 39 and into wedge bars 46. Tubes 43 are also held securely against outward movement by slotted flange key blocks 49 (FIG. 3) and 50 which are fastened to base plate 51 and support plate 31 respectively by screws 52. The flange 40 and similar upper flange 41 are fastened to base plate 51 and to support plate 31 by a plurality of bolts 53 (FIG. 6). The wedge bars 46 are provided with a linear taper extending a short distance from the opposite ends of each wedge bar 46. These end tapered portions 56 serve to lead balls 45 into and out of wedged frictional contact with feed pipe 9 and wedge surface 48 as the ball streams 45 move in their closed circuit paths as a consequence of linear movements by feed pipe 9. These upper or lower points at which the balls 45 attain a firmly wedged condition or are freed from that wedged condition are herein defined as being in clutching or declutching positions and are subject to alternate location with changes in the direction of ball stream 45 linear movements as incurred with the raising or lowering of feed pipe 9.

Base plate 51 with its heavy edge reinforcing angle 53 (FIG. 3) serves to distribute the total weight over a substantial foundation bearing area, and is rigidly held in place by a plurality of foundation bolts 57.

FIGURES 4, 5, 6 and 7 are sectionally related to the previously described figures 1, 2, or 3 and have been reviewed by cross-referencing during the description of said figures 1, 2 and 3.

The foregoing descriptions and drawings of this invention are explanatory thereof, and various arrangements for applying the features and details of the illustrated construction may be made without departing from the scope of this invention.

I, therefore, desire to secure by Letters Patent, those features which fall within the scope of the following, wherein I claim:

1. In a hoisting apparatus, a helically moving stream of wedged ball bearings surrounding and firmly clutching the exterior surface of a longitudinally extending cylindrical member located axially within a rotative tubular ball clutch body, a source of rotative power applied to said rotative tubular clutch body, a linear ball clutch tubular nonrotative body with a plurality of oppositely inclined wedgelike surfaces on the interior of said body, and a plurality of linearly moveable ball bearing streams each of which is moveably wedged into clutched contact with the exterior surface of said axially extending cylindrical member.

2. In a hoisting apparatus, a tubular non-rotative ball clutch body, a plurality of elongated wedge-bars separately spaced around the inner periphery of said tubular body in pairs with oppositely inclined inwardly projecting surfaces, a linearly moveable cylindrical member axially positioned within said tubular body, a plurality of linearly moveable ball bearing streams each confined within a closed circuitous path that includes the wedgelike space between hte outer surface of the cylindrical member and the inclined surface of a wedge-bar, and a ball spreader of resilient character positioned adjacent to the thinner longitudinal sides of each pair of wedge bars.

3. In a hoisting apparatus, a ball clutch with a rotative tubular body containing a series of continuous acute angle wedgelike helically grooved convolutions on its inner periphery, a longitudinally movable nonrotative cylindrical feed pipe co-axially extending through said ball clutch body, and a continuous spirally movable stream of contiguous balls simultaneously clutching the exterior surface of said feed pipe and the wedgelike surface of said continuous helically grooved convolutions.

4. In a hoisting apparatus, a ball clutch with a rotative tubular body containing a series of spirally continuous acute angle wedgelike convolutions on its inner periphery, a longitudinally movable nonrotative cylindrical feed pipe co-axially extending through said ball clutch body, and a continuous spirally movable stream of wedged balls confined within a closed circuitous path that includes the aforesaid helically grooved continuous convolutions.

5. In a hoisting apparatus, a ball clutch with a rotative tubular body containing a series of spirally continuous acute angle wedgelike convolutions on its inner periphery, a longitudinally movable nonrotative cylindrical feed pipe co-axially extending through said ball clutch body, a movable stream of ball bearings confined within a closed circuitous path that includes a point of transition from linear ball movement to a helically wedged ball movement, and a point of transition whereby said helically wedged ball movement reverts into a linear ball movement.

6. In a hoisting apparatus, a ball clutch with a rotative tubular body containing a series of spirally continuous wedgelike convolutions on its inner periphery, a longitudinally extending nonrotative cylindrical feed pipe co-axially extending through said ball clutch body, a continuous spirally movable stream of contiguous balls simultaneously clutching the exterior cylindrical surface of said feed pipe and the wedgelike surface of said grooved convolutions, and a source of rotative power acting upon said ball clutch body to produce a linear movement of the cylindrical feed pipe.

7. In a hoisting apparatus, a linearly movable ball clutch with a nonrotative tubular body, a plurality of acute angle wedgelike bars spaced around the inner periphery of said tubular body, a cylindrical feed pipe co-axially positioned within said nonrotative tubular body, and a plurality of linearly movable ball streams with each stream confined within a closed circuitous path that includes a wedgelike space between the outer surface of said cylindrical feed pipe and the inclined surface of a wedge bar.

References Cited in the file of this patent

UNITED STATES PATENTS

| | | |
|---|---|---|
| 1,760,708 | Miller | May 27, 1930 |
| 2,001,668 | Maier | May 14, 1935 |
| 2,455,368 | Hoffar | Dec. 7, 1948 |
| 2,715,925 | Morgan | Aug. 23, 1955 |
| 2,860,750 | Avanzati | Nov. 18, 1958 |